United States Patent [19]

Schumacher et al.

[11] 4,292,884
[45] Oct. 6, 1981

[54] CONTROL ARRANGEMENT FOR A HYDRAULICALLY OPERATED DEVICE

[75] Inventors: Werner Schumacher, Asperg; Günther Schwerin, Möglingen, both of Fed. Rep. of Germany

[73] Assignee: Robert Bosch GmbH, Stuttgart, Fed. Rep. of Germany

[21] Appl. No.: 9,045

[22] Filed: Feb. 2, 1979

[30] Foreign Application Priority Data

Apr. 14, 1978 [DE] Fed. Rep. of Germany ....... 2816212

[51] Int. Cl.³ ..................... F15B 11/08; F15B 13/043
[52] U.S. Cl. ......................................... 91/445; 91/446; 91/459; 91/461; 137/596.16; 137/596.2
[58] Field of Search ................. 91/433, 445, 446, 447, 91/448, 459, 461, 460; 137/596.12, 596.16, 596.14, 625.48, 102, 596.2, 596.1; 251/51, 50

[56] References Cited

U.S. PATENT DOCUMENTS

| | | | |
|---|---|---|---|
| 2,495,785 | 1/1950 | Stephens | 137/102 |
| 3,015,316 | 1/1962 | Thomas | 91/447 X |
| 3,411,521 | 11/1968 | Johnson | 91/420 X |
| 3,537,259 | 11/1970 | Gordon et al. | 60/471 |
| 3,906,838 | 9/1975 | Hofer | 91/459 |
| 3,980,000 | 9/1976 | Iijima et al. | 137/596.1 X |

*Primary Examiner*—Irwin C. Cohen
*Attorney, Agent, or Firm*—Michael J. Striker

[57] ABSTRACT

A control arrangement for a hydraulically operated load lifting and lowering device includes precontrolled first valve means controlling flow of fluid from a source under pressure to a return conduit leading to a tank or to a working conduit leading to the device and a closer block in the working conduit, including a piston controlling flow of pressure fluid from the working conduit into the device, respectively flow of pressure fluid out of the device into the return conduit downstream of the piston. A throttle is arranged in the return conduit to produce upstream of the throttle a pressure acting on the piston but not on the slide of the first valve means, whereby without increasing the neutral fluid circulation pressure a uniform lowering of the load independent of the magnitude thereof may be obtained.

7 Claims, 1 Drawing Figure

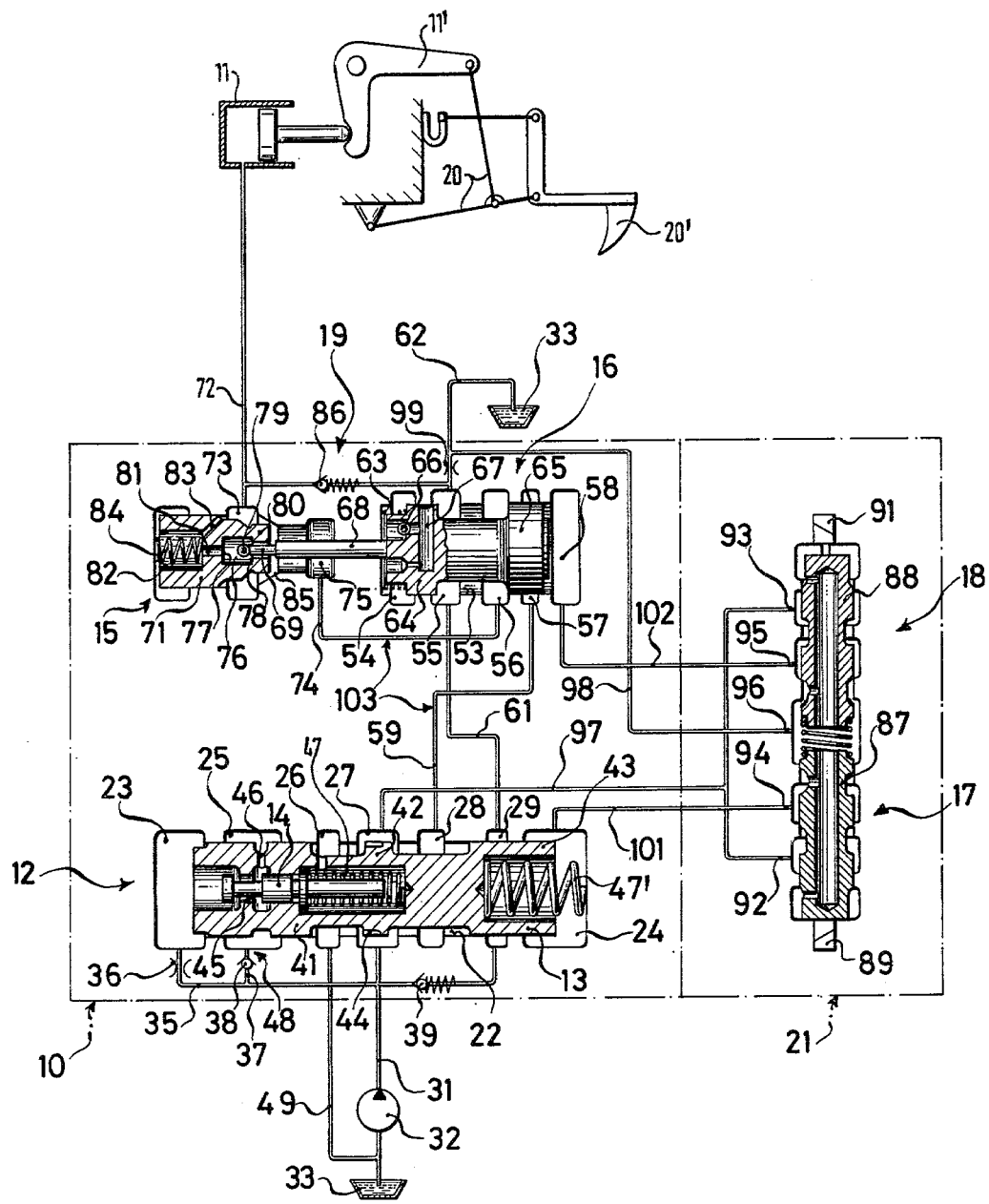

CONTROL ARRANGEMENT FOR A HYDRAULICALLY OPERATED DEVICE

BACKGROUND OF THE INVENTION

The present invention relates to a control arrangement for a hydraulically operated device and more specifically to a hydraulically operated cylinder-and-piston unit for raising and lowering a load during feeding of hydraulic fluid into the cylinder of the unit, respectively during discharge of such fluid therefrom. Such devices are known in the art and, for instance, disclosed in the copending applications to Maucher et al, Ser. Nos. 930,979 and 930,982. In these known control arrangements hydraulic fluid flows during a lowering of the load from the device over a check valve and a release piston into a return conduit connected to the tank, whereby the neutral circulation pressure of the fluid holds the release piston in an open position. The disadvantage of these known devices is that the speed of lowering of the load depends on the magnitude of the load, so that the lowering process occurs rather fast if a great load acts on the device and rather slow if a small load acts thereon.

SUMMARY OF THE INVENTION

It is an object of the present invention to provide a control arrangement for a hydraulically operated cylinder-and-piston unit for raising and lowering a load in which the above-mentioned disadvantage of the known control arrangements for this purpose is avoided.

It is an additional object of the present invention to provide a control arrangement for a hydraulically operated cylinder-and-piston unit for raising and lowering a load in which the lowering speed will be substantially constant and independent of the magnitude of the load.

It is a further object of the present invention to provide a control arrangement of the aforementioned kind which is composed of relatively few and simple parts so that it may be built at reasonable cost and will operate trouble-free during extended use.

With these and other objects in view, which will become apparent as the description proceeds, the control arrangement of the present invention for a hydraulically cylinder-and-piston unit for raising and lowering of a load during feeding of hydraulic fluid into the cylinder of the unit, respectively during discharge of such fluid therefrom, mainly comprises a source of hydraulic fluid under pressure, a return conduit leading to a tank, an inlet conduit connected to the aforementioned source, first valve means connected to the inlet conduit and movable between a first position connecting the inlet conduit with the return conduit and a second position connecting the inlet conduit with the consumer conduit leading to the cylinder of the unit, precontrol valve means coordinated with the first valve means for controlling the position thereof, the precontrol valve means having a return connection connected to a further return conduit, second valve means in the consumer conduit including a release piston movable between a first position directing flow of fluid through the consumer conduit to the cylinder of the unit and a plurality of second positions permitting flow of fluid from the cylinder to the further return conduit, the second valve means including a damping compartment and a control compartment to opposite sides of the release piston, the damping compartment being connected to the further return conduit and the control chamber being connected to the precontrol valve means, and a throttle in the further return conduit, the return connection of the precontrol valve means being connected to a point of the further return conduit located downstream of the throttle, so that upon increase of outflow of fluid from the cylinder the pressure in the damping compartment rises and the second valve means being constructed to decrease the outflow of fluid from the cylinder as the pressure in the damping compartment rises, and vice versa, whereby the speed of lowering of the load will be independent of the magnitude of the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single drawing schematically illustrates the control arrangement of the present invention as well as the hydraulically operated device connected thereto, in which the elements of the control arrangement are shown in a position they assume during the load lowering operation.

DESCRIPTION OF THE PREFERRED EMBODIMENTS

Referring now to the drawing, it will be seen that the control arrangement 10 according to the present invention may be used to control operation of a hydraulically operated lifting device which may include, as schematically shown in the drawing, a cylinder-and-piston unit 11, the piston rod of which engages one arm of a crank lever 11', whereas the other arm of the crank lever is connected to a three-point linkage 20 carrying for instance a plow 20', which has to be lifted or lowered. Of course, it is to be understood that the control arrangement 10 may also be used for controlling operation of hydraulically operated lifting devices of different construction than that schematically shown in the drawing.

The control arrangement 10 mainly comprises first valve means 12 having a reversing valve slide 13 and a control valve slide 14 arranged in a blind bore of the reversing valve slide 13, a check valve 15 arranged in the pressure fluid stream of the hydraulically operated load lifter 11, which check valve 15 has the function of a one-way valve and a lowering valve, a release piston 16 coordinated with the check valve 15, as well as a first precontrol valve 17 coordinated with the first valve means 12 and a second precontrol valve 18 coordinated with the release piston 16. The check valve 15 and the release piston 16 form together a closer block 19 and the two precontrol valves 17 and 18 form a precontrol stage 21.

The reversing valve slide 13 of the first valve means 12 is reciprocally arranged in a bore 22 which at opposite closed ends is enlarged to a first control chamber 23 and a second control chamber 24. Between the aforementioned two control chambers 23 and 24 and starting from the control chamber 23 there are arranged in the bore 22 and about the reversing valve slide 13, a third control chamber 25, an outlet chamber 26, an inlet chamber 27, a consumer chamber 28 and a relief chamber 29 spaced in axial direction from each other. The inlet chamber 27 is connected by an inlet conduit 31 with a source of hydraulic fluid under pressure, here shown as a pump 32 which sucks oil from a tank 33. From the inlet conduit 31 leads a first control conduit 35 over a throttle 36 directly to the first control chamber 23. The first control conduit 35 is further connected by a control channel 37, in which a non-return valve 38 is arranged, with the third control chamber 25, so that the throttle 36 and the non-return valve 38 are arranged parallel to each other. The inlet conduit 31 is further connected over a pressure limiting valve 39 to the relief chamber 29. The reversing valve slide 13 is provided with three piston sections 41, 42 and 43 and the piston section 42, that is the piston section located between the other two, is provided with a fine control chamfer 44. The first piston section 41, adjacent to the first control chamber 23, is provided with a coaxial bore 45, in which the control slide 14 is axially guided. The first control chamber 23 is connected through a transverse bore 46 in the first piston section 41 and the longitudinal bore 45 with the third control chamber 25, whereby this connection may be closed by the control slide 14. The control slide 14 is biased by a spring 47 to the illustrated rest position. A second spring 47', arranged in the second control chamber 24, biases the reversing slide 13 in the direction towards the first control chamber 23. The transverse bore 46 in the reversing valve slide 13 forms together with the control channel 37 and the non-return valve 38 parts of a second control conduit 48 which, parallel to the first control conduit 35, connects the first control chamber 23 with the inlet conduit 31. An outlet conduit 49 leads from the outlet chamber 26 to the tank 33.

The release piston 16 is guided in a longitudinal bore 53 which forms at opposite ends thereof a damping compartment 54 and a control compartment 58, and between the aforementioned compartments, an outlet compartment 55 adjacent the damping compartment 54, a run-on compartment 56 and an inlet compartment 57. A consumer channel 59 leads from the inlet compartment 57 to the consumer chamber 28 of the first valve means 12, and the relief chamber 29 thereof is connected over a relief channel 61 with the outlet compartment 55 of the release piston 16, which is further relieved through a return conduit 62 to the tank 33. A spring 63 arranged in the damping compartment 54 engages the release piston 16 and biases the latter in the direction toward the control compartment 58. The release piston 16 has a first piston section 64 facing the damping compartment 54 and a second piston section 65 closing the control compartment 58 at one end thereof. The first piston section 64 controls, in a non-illustrated starting position of the release piston 16, not only a connection from the damping compartment 54 to the outlet compartment 55, but receives also a throttling one-way valve 66 which, over a cross-bore 67, provides an additional connection between the damping compartment 54 and the outlet compartment 55. A plunger 68 having a reduced diameter portion 69 at a free end thereof, projects from the first piston section 56 toward the check valve 15.

The check valve 15 has a stepped main valve body 71 which controls the connection between a first chamber 73 of the check valve 15, which is connected by a consumer conduit 72 with the piston of the load lifter 11, and a second chamber 75 which over a channel 74 is connected with the run-on compartment 56 of the release piston 16. The main valve body 71 is hollow and receives, in a space 76 formed therein and providing a first and a second valve seat 77, respectively 78, a ball 79 as closure member. The space 76 is connected, through an axial bore 81, on the one hand, with the second chamber 75 and, on the other hand, with a spring compartment 82, which over a throttle bore 83 is connected with the first chamber 73. A spring 84 in the spring compartment 82 biases the main valve body 71 against a conical seat 85, whereby the pin 69 forming a continuation of the plunger 86 projects through that part of the axial bore 81 which passes through a projection 80 of the main valve body 71 which carries a fine control chamfer. The consumer conduit 72 is protected against maximum pressures, resulting, for instance from certain fluid oscillations or overloading, by being connected to the return conduit 62 over a pressure limiting valve 86.

The two precontrol valves 17 and 18 of the precontrol stage 21 are of the same construction and each being constructed as a three-port, two-position valve having each a valve slide 87, respectively 88, arranged in a common bore and biased away from each other by a coil spring located between the same to respective rest positions from which they may be moved to operating positions by magnets 89, respectively 91, upon energizing of these magnets. Each of the precontrol valves 17 and 18 has an inlet terminal 92, respectively 93, a consumer terminal 94, respectively 95 and a common return terminal 96. Both inlet terminals 92 and 93 are connected by a conduit 97 with the inlet chamber 27 of the valve means 12. A conduit 98 leads from the common return terminal 96 to the return conduit 62, to a point of the latter which is located downstream of a throttle 99 in the return conduit 62. The consumer terminal 94 is connected over a conduit 101 with the second control chamber 24 of the valve means 12 and the consumer terminal 95 is connected over a conduit 102 with the control compartment 58 of the release piston 16.

The consumer channel 59, the channel 74 and the consumer conduit 72 form parts of a working conduit 103 leading from the valve 12 over the closer block 19 to the hydraulically operated load lifter 11.

The above-described control arrangement 10 will operate as follows:

In a non-illustrated neutral position neither of the precontrol valves 17 and 18 is actuated, the second control chamber 24 of the valve 12 and the control compartment 58 of the release piston 16 are relieved of pressure over the conduit 98 and the return conduit 62. The oil pumped by the pump 32 passes through the inlet conduit 31 into the inlet chamber 27 and from there into the outlet chamber 26 and through the outlet conduit 49 into the tank 33, whereby due to the force of the spring 47' a small neutral circulation pressure will be maintained in the inlet chamber 27, which over the conduit 97 will be transmitted to the inlet terminals 92 and 93 of the two precontrol valves 17 and 18. The hydraulically operated load lifter 11 is thereby hydraulically blocked by the check valve 15.

In order to start lifting movement of the hydraulically operated load lifter 11, the electromagnetic 89 of the first precontrol valve 17 is actuated. Thereby it connects its inlet terminal 92 with its consumer terminal 94. The second control chamber 24 on the reversing valve slide 13 obtains thereby neutral circulation pressure, whereby the spring 47' moves the now pressure equalized reversing valve slide 13 toward the left, as viewed in the drawing, whereby the connection between the inlet conduit 31 to the outlet conduit 49 is throttled. The oil flows now over the working conduit 103 to the load lifter 11, whereby the check valve 15 acts as normal check valve since its ball 79 engages the first valve seat 77. The control compartment 58 is thereby relieved of pressure over the second precontrol valve 18, the conduit 98 connected to the return conduit 62 leading to the tank 33, whereby the release piston 16 is held by the force of the spring 63 in its starting position abutting with its right end against the closed end of the control compartment 58 and in which it connects only the run-on compartment 56 with the inlet compartment 57 to hold thereby the working conduit 103 open.

In order to initiate a load lowering by the load lifter 11, the magnet 91 of the second precontrol valve 18 is actuated so as to move the valve slide 88 of the second precontrol valve 18 to the position shown in the drawing. Thereby the control compartment 58 will be connected over the conduit 102, the terminals 95 and 93 at the second precontrol valve 18 and the conduit 97 with the inlet chamber 27 of the first valve means 12. This produces in the control compartment 58 the neutral circulation pressure which will hold the release piston 16 together with the check valve 15 in the illustrated positions, respectively load the same in the direction towards the left, as viewed in the drawing. At the same time, there will act on the release piston 16 a pressure head in the damping compartment 54 and the force of the spring 63 in opposition to the pressure acting on the release piston 16 in the pressure compartment 58. The pressure head in the damping compartment 54 is produced in that the hydraulic fluid flowing out from the cylinder of the unit 11 over the check valve 15, the channel 74 and the return conduit 62 to the tank 33 will be throttled at the throttle 99. The pressure produced upstream of the throttle in the return conduit 62 acts over the cross-bore 67 in the release piston 16 and the one-way valve 66 in the damping compartment 54, and the thus-produced pressure has no possibility to pass over the precontrol stage 21 into the second control chamber of the valve 12 to thereby influence the neutral circulation pressure. If the load acting on the load lifter 11 is great, more pressure fluid will flow through the throttle 99 thereby increasing the pressure head upstream of the throttle. The release piston 16 thereby moves towards the right, as viewed in the drawing, and therewith also the main valve body 71 which thereby with its projection 18 extending into the conical seat 85 throttles the flow of the pressure fluid to an increasing extent. On the other hand, if a smaller load acts on the load lifter 11, less pressure fluid will pass through the throttle 99 and the pressure head produced upstream of the same will thereby be reduced, whereby the release piston 16 and the main valve body 71 moves under the action of the neutral circulation pressure towards the left, as viewed in the drawing, so that the projection 80 opens a greater throughflow cross-section. The closer block 19 operates thereby as lowering throttle and holds independent of the magnitude of the respective load the flow of pressure fluid to the tank 33 substantially constant. Thereby the release piston 16 and the main valve body 71 cooperate together in the manner of a sequential control, whereby the release piston has to provide only very small forces. The neutral circulation pressure can thus be held at a small value.

It will be understood that each of the elements described above, or two or more together, may also find a useful application in other types of control arrangements for hydraulically operated devices, differing from the types described above.

While the invention has been illustrated and described as embodied in a control arrangement for a hydraulically operated cylinder-and-piston unit for raising and lowering of a load, it is not intended to be limited to the details shown, since various modifications and structural changes may be made without departing in any way from the spirit of the present invention.

Thus, for instance, the precontrol stage may be constructed in a different manner than shown and described, for instance, instead of two valves a single valve may be used. Thereby it is only necessary that during the lowering process no connection is obtained through which the pressure produced upstream of the throttle 99 would act on the valve slide 13. Even though the illustrated construction is especially advantageous it would also be possible to transfer the adjustable throttle for the lowering throttle function from the main valve body 71 to the release piston 16 by, for instance, providing the first piston section 64 with a corresponding control edge. Furthermore, instead of the shown one-way valve in the main valve body 61 with the two valve seats for the ball 79 it is also possible to use another closer valve, as is used in known precontrolled closer blocks.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control arrangement comprising a hydraulically operated cylinder and piston unit having a cylinder and a piston reciprocable therein for raising a load during feeding of hydraulic fluid into said cylinder of the unit, and lowering a load during discharge of said fluid therefrom, said arrangement further comprising a source of hydraulic fluid under pressure; an outlet conduit leading to a tank; an inlet conduit connected to said source; first valve means connected to said inlet conduit and movable between a first position connecting said inlet conduit with said outlet conduit and a second position connecting said inlet conduit with working conduit means leading to said cylinder of the unit; precontrol valve means coordinated with said first valve means for controlling the position thereof, said precontrol valve means having a return terminal connected to a return conduit leading to said tank and inlet terminal means leading over said first valve means to said source; second valve means in said working conduit means including a release piston movable between a first position directing flow of fluid through said working conduit means to said cylinder of the unit and a plurality of second positions permitting flow of fluid from said cylinder to said return conduit, said second valve means including a damping compartment and a control compartment on opposite sides of said releasing piston; passage means connecting said damping compartment to said return conduit and conduit means connecting said control compartment to said precontrol valve means; and a throttle in said return conduit, said return terminal of said precontrol valve means being connected to a point of said return conduit located downstream of said throttle so that upon increase of outflow of fluid from said cylinder the pressure in said damping compartment rises and said second valve means being constructed to decrease outflow of fluid from said cylinder as the pressure in said damping compartment rises, whereby the speed of lowering of the load will be independent of the magnitude of the load.

2. A control arrangement as defined in claim 1, wherein said first valve means comprises a reversing valve slide, spring means biasing said valve slide to said second position of said first valve means and a control chamber connected to said source so that fluid pressure in said control chamber biases said valve slide to said first position.

3. A control arrangement as defined in claim 1, wherein said precontrol valve means comprises a pair of operator controlled valves.

4. A control arrangement as defined in claim 3, wherein said pair of operator controlled valves are solenoid operated, three port-two position valves and having valve spools arranged in a common bore spaced from each other, said return terminal communicating with the space between said valve spools, wherein the first valve means comprises a reversing valve slide, spring means biasing said reversing valve slide to said second position of said first valve means, a first control chamber connected to said source at one end of said reversing valve slide and a second control chamber at the other end of said valve slide, said second control chamber communicating with said return terminal of said precontrol valve means when a respective one of the valve spools thereof is not actuated.

5. A control arrangement as defined in claim 2, wherein said second valve means further comprises check valve means in said working conduit means and including between said damping compartment and said control compartment an annular outlet compartment, an annular run-on compartment and an annular inlet compartment about said release piston, said outlet compartment communicating with said return conduit, said run-on compartment communicating with said check valve means, and said inlet compartment communicating with said first valve means.

6. A control arrangement as defined in claim 5, wherein said release piston has a first piston section controlling communication between said run-on compartment and said outlet compartment and a second piston section controlling communication between said run-on compartment and said inlet compartment.

7. A control arrangement as defined in claim 1, wherein said second valve means further comprises check valve means in said working conduit means downstream of said release piston and forming therewith a sequential control, said check valve means comprising a valve member biased against a conical valve seat and forming with said conical valve seat an adjustable throttle for regulating the speed of lowering of the load.

* * * * *